United States Patent
Ooi (10) Patent No.: US 8,513,547 B2
(45) Date of Patent: Aug. 20, 2013

(54) IMAGE READING APPARATUS AND IMAGE READING METHOD

(75) Inventor: Kazushige Ooi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 919 days.

(21) Appl. No.: 12/572,775

(22) Filed: Oct. 2, 2009

(65) Prior Publication Data

US 2010/0238523 A1 Sep. 23, 2010

(30) Foreign Application Priority Data

Mar. 23, 2009 (JP) ................................ 2009-069702
Mar. 25, 2009 (JP) ................................ 2009-073774

(51) Int. Cl.
*G06F 3/042* (2006.01)

(52) U.S. Cl.
USPC ......... 178/18.09; 345/175; 345/180; 345/183

(58) Field of Classification Search
USPC .................... 345/179–183; 178/18.09–18.11
See application file for complete search history.

(56) References Cited

U.S. PATENT DOCUMENTS

| | | | |
|---|---|---|---|
| 5,140,143 A | | 8/1992 | Nakazawa |
| 5,652,412 A | * | 7/1997 | Lazzouni et al. .......... 178/18.01 |
| 5,852,434 A | * | 12/1998 | Sekendur ....................... 345/179 |
| 7,559,664 B1 | * | 7/2009 | Walleman et al. ............... 362/84 |
| 2006/0028459 A1 | * | 2/2006 | Underwood et al. ......... 345/179 |
| 2009/0167702 A1 | * | 7/2009 | Nurmi ............................ 345/173 |
| 2010/0206645 A1 | * | 8/2010 | Harel ......................... 178/19.02 |

FOREIGN PATENT DOCUMENTS

| | | |
|---|---|---|
| JP | 02-183879 | 7/1990 |
| JP | 06-222871 | 8/1994 |
| JP | 2004-094907 | 3/2004 |
| JP | 2008-204328 | 9/2008 |

* cited by examiner

*Primary Examiner* — William Boddie
*Assistant Examiner* — Sahlu Okebato
(74) *Attorney, Agent, or Firm* — Sughrue Mion, PLLC (57) ABSTRACT

An image reading apparatus includes: a pointer having an axis extending along an axis line, that indicates a position on a medium; N (N≧3) irradiating units that respectively irradiate light toward an area that includes the position; and a signal generator that generates, from the irradiated light reflected by the medium, a signal representing an image on the medium.

20 Claims, 9 Drawing Sheets

IMAGE READING APPARATUS AND IMAGE READING METHOD

CROSS-REFERENCE TO RELATED APPLICATIONS

This application is based on and claims priority under 35 U.S.C. 119 from Japanese Patent Application Nos. 2009-69702 and 2009-73774, which were filed on Mar. 23, 2009 and Mar. 25, 2009, respectively.

TECHNICAL FIELD

The present invention relates to an image reading apparatus.

RELATED ART

In recent years, technologies for converting content written on paper to electronic data, transferring this data to a personal computer, mobile telephone or the like, and displaying the written content on a monitor, or transferring/saving the written content as data have been attracting interest. These technologies use special paper having tiny dots formed in various different patterns printed on the surface thereof, and a digital pen that digitizes the written content by reading these dots. This digital pen reads the dot pattern in the vicinity of the pen point with an imaging device when writing is performed on the special paper, and specifies the position of the pen point on the special paper based on the read dot pattern.

SUMMARY

In an aspect of the invention, there is provided an image reading apparatus including: a pointer having an axis extending along an axis line, that indicates a position on a medium; N (N≧3) irradiating units that respectively irradiate light toward an area that includes the position; and a signal generator that generates, from the irradiated light reflected by the medium, a signal representing an image on the medium.

BRIEF DESCRIPTION OF THE DRAWINGS

Exemplary embodiments of the present invention will be described in detail based on the following figures, wherein.

DETAILED DESCRIPTION

FIRST EXAMPLE

A. Configuration

Figure 1:
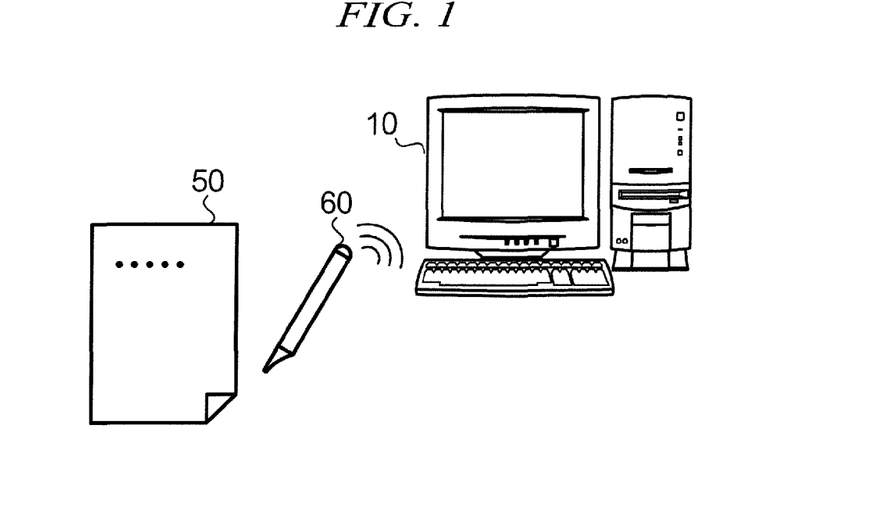
FIG. 1 shows the overall configuration of a writing information processing system.

FIG. 1 shows an exemplary configuration of a system according to an embodiment of the present invention. In FIG. 1, a digital pen 60 is an exemplary reading apparatus provided with a function of writing characters, graphics and the like on a medium 50 such as paper, and a function of reading a code pattern image (image to be read) formed on the medium 50. An information processing apparatus 10 is an exemplary writing information generating apparatus that is a personal computer, for example, and generates writing information representing written content according to signals output from the digital pen 60.

The code pattern image formed on the medium 50 is obtained by encoding identification information identifying the medium 50 and position information representing coordinate positions on the medium 50 to create an image.

Figure 2:
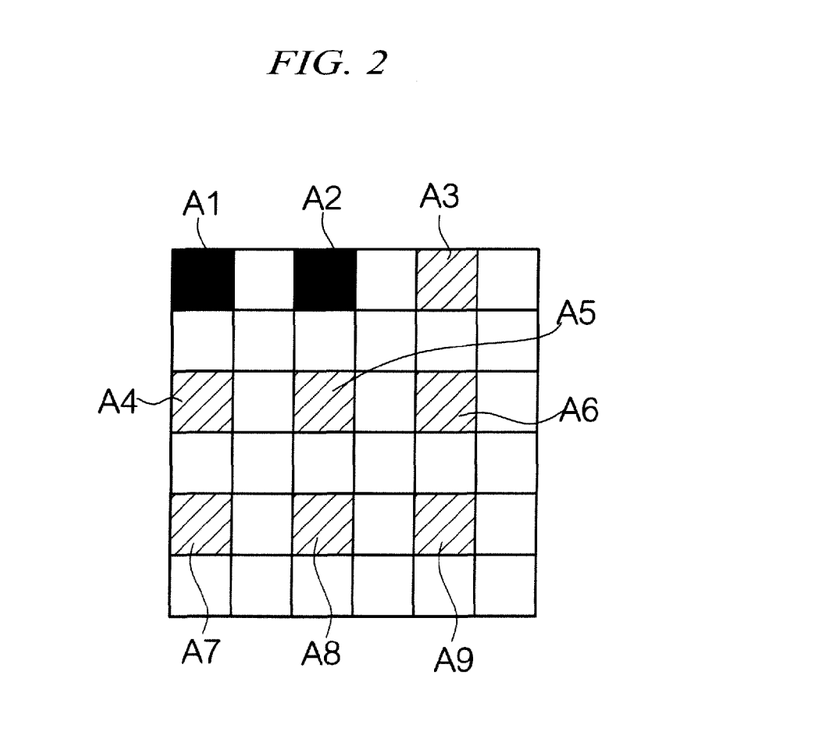
FIG. 2 shows the content of a code pattern image.

Here, an exemplary code pattern image formed on the medium 50 will be described with reference to FIG. 2. FIG. 2 shows an exemplary code pattern image formed on the medium 50. The code pattern image represents the abovementioned identification information and position information by the mutual positional relation of multiple dot images, and areas A1 to A9 are predetermined as areas in which these dot images can be disposed. In the example shown in FIG. 2, the black areas A1 and A2 show areas in which dot images are disposed, and the shaded areas A3 to A9 show areas in which dot images are not disposed. The identification information and the position information are expressed by which areas the dot images are disposed in. This code pattern image is formed over the entire medium 50 by an electrophotographic image forming apparatus (not shown) such as a printer, for example. The digital pen 60 reads the code pattern image, and detects the position of a pen point 69A (see FIG. 3) of the digital pen 60 by analyzing the read code pattern image. The digital pen 60 then transmits the position information indicating the detected position to the information processing apparatus 10. The information processing apparatus 10 generates writing information representing an image obtained by disposing pixels in positions corresponding to the position information, displays an image according to the writing information on a display or the like, thereby presenting the written content to the user.

Apart from the abovementioned code pattern image, an image such as a document, graphics or the like aimed at conveying information to a person may be formed on the medium 50. Hereinafter, this image will be called a "document image", but includes images such as pictures, photographs and graphics, as well as other images, rather than being limited to an image representing a document that includes text. The image forming apparatus performs image forming using K (black) toner when forming a code pattern image, and performs image forming using C (cyan), M (magenta) and Y (yellow) toner when forming a document image. The document image and the code pattern image are formed one on top of the other on the medium 50. The code pattern image and the document image are formed using materials with different spectral reflection characteristics, and the digital pen 60 is set so as to read only the code pattern image making use of the different spectral reflection characteristics.

Note that the "medium" in the present example may be a plastic sheet such as an OHP sheet, for example, or a sheet of another material, rather than being limited to so-called paper. The "medium" may also be so-called digital paper whose display content is electrically rewritable. In short, the medium 50 need only have at least a code pattern image formed thereon.

Figure 3:
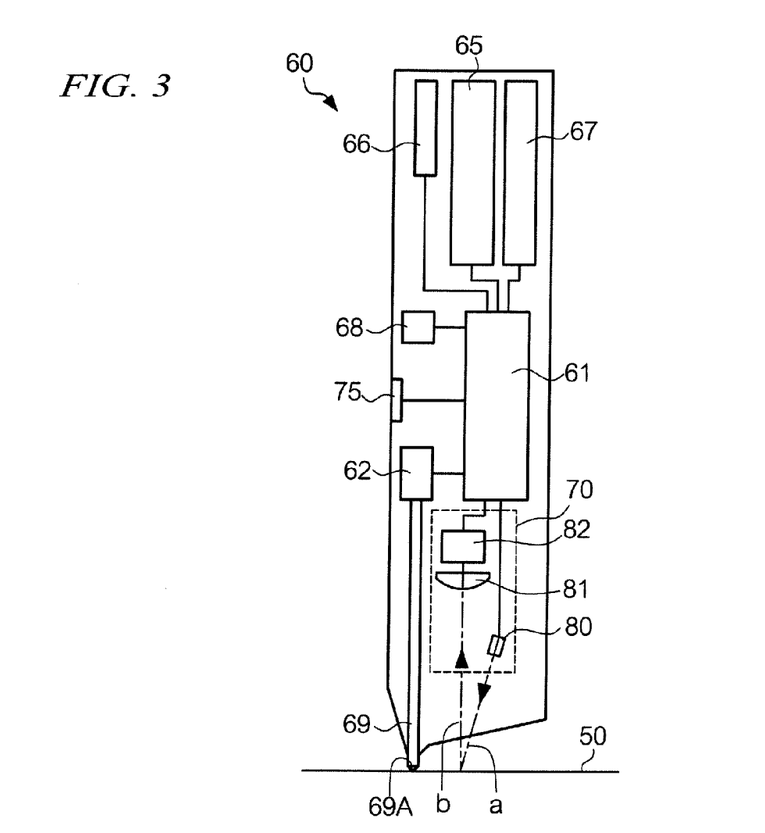
FIG. 3 is a functional block diagram schematically showing the function of a digital pen.

Next, a basic configuration of the digital pen 60 will be described with reference to the drawings. FIG. 3 is a functional block diagram schematically showing the functions of the digital pen 60. In FIG. 3, a controller 61 is a controller that controls the operation of the entire digital pen 60. Various parts of the digital pen 60 are connected to the controller 61. A pressure sensor 62 is a detecting unit that detects a writing operation by the digital pen 60, by pressure applied to a pen tip 69.

An optics unit 70 is equipped with an irradiating unit 80, an image forming unit 81, and an imaging unit 82. The irradiating unit 80 is an exemplary irradiating unit that is a near-infrared LED (light emitting diode), for example, and irradiates near-infrared light onto the medium 50 along an irradiation axis a. The image forming unit 81 is an exemplary image forming unit that collects reflected light reflected by the medium 50 along a light-receiving axis b, and forms an image of the image on the medium 50 on the imaging unit 82 according to the reflected light, the image forming unit 81 being configured by a convex lens, for example. The imaging unit 82 is an exemplary signal generating unit that converts the image of the image on the medium 50 formed by the image forming unit 81 according to the reflected light to electrical signals, and includes a CMOS (Complementary Metal Oxide Semiconductor) image sensor, a CCD (Charge Coupled Device) image sensor, or the like.

A first memory 65 is a memory that stores identification information and position information. A communication unit 66 is a communication unit that controls communication with an external device. A battery 67 is a rechargeable power supply unit that supplies power for driving the digital pen 60 to the various parts. A second memory 68 is a memory that stores identification information (pen ID) of the digital pen 60. The pen tip 69 has a penholder that extends along the axis line, and the front end portion (tip) thereof forms the pen point 69A. This pen tip 69 is an exemplary indicating unit that indicates a position on the medium 50 having the code pattern image (image to be read) formed thereon with the pen point 69A, when a writing operation is performed by a user. The irradiating unit 80 irradiates light having the irradiation axis a as the axis thereof in a predetermined irradiation range, toward a medium area that includes the position on the medium 50 indicated by the pen point 69A, when a writing operation is performed by the user. Beams of light irradiated from the irradiating unit 80 respectively have different directivities, and travel toward the medium 50 in a diffused state.

A switch 75 is operated by the user, and various settings of the digital pen 60 are switched according to the operation.

Figure 4:
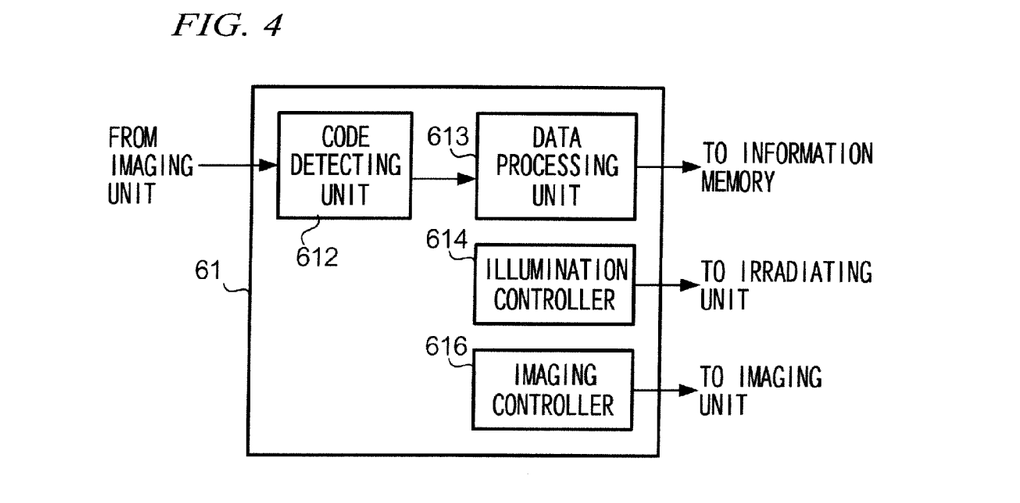
FIG. 4 is a functional block diagram showing a controller of a digital pen.

Next, the functional configuration of the controller 61 will be described with reference to FIG. 4. FIG. 4 is a functional block diagram of the controller 61. In FIG. 4, a code detecting unit 612 detects the code pattern image from the signals output from the imaging unit 82 (signals representing imaged images). A data processing unit 613 extracts the identification information and the position information from the code pattern image detected by the code detecting unit 612. An illumination controller 614 transmits illumination control signals for causing the irradiating unit 80 to pulse to the irradiating unit 80, and causes the irradiating unit 80 to pulse. An imaging controller 616 supplies image capture signals that are synchronized with the illumination control signals transmitted to the irradiating unit 80 to the imaging unit 82.

Figure 5:
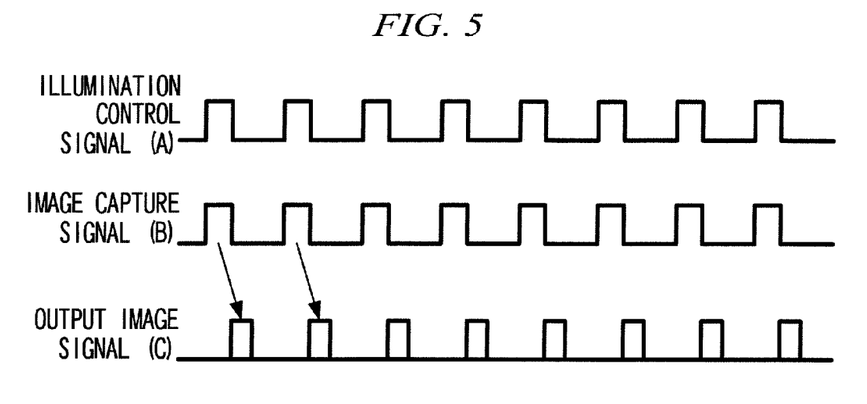
FIG. 5 shows an output timing chart relating to an illumination control signal, an image capture signal and an output image signal.

Further, a schematic of the operation of the controller 61 in the digital pen 60 will be described. FIG. 5 is a timing chart showing output timing of the illumination control signals controlling the pulsing of the irradiating unit 80, the image capture signals to the imaging unit 82, and output image signals. When the user starts writing by the digital pen 60, the pressure sensor 62 connected to the pen tip 69 detects the writing operation. The controller 61 thereby starts the process of reading identification information and position information.

Firstly, the illumination controller 614 of the controller 61 transmits illumination control signals ((A) in FIG. 5) for causing the irradiating unit 80 to pulse to the irradiating unit 80, and causes the irradiating unit 80 to pulse.

The imaging unit 82 images the image on the medium 50 in synchronization with the image capture signals ((B) in FIG. 5). At this time, the imaging unit 82 images the image on the medium 50 illuminated by the pulsing irradiating unit 80. Thus, in the imaging unit 82, image signals (output image signals: (C) in FIG. 5) relating to the image on the medium 50 illuminated by the irradiating unit 80 are generated in order.

The output image signals sequentially generated by the imaging unit 82 are sent to the code detecting unit 612. The code detecting unit 612, having received the output image signals, processes the output image signals, and detects the code pattern image from the images imaged by the imaging unit 82. The code pattern image acquired by the code detecting unit 612 is sent to the data processing unit 613. The data processing unit 613, having received the code pattern image, decodes the code pattern image, and acquires the identification information and the position information embedded in the code pattern image.

The above is the basic configuration of the digital pen 60.

Next, the structure of the digital pen 60 according to the present example will be described with reference to the drawings. In the digital pen 60, three irradiating parts 80A, 80B and 80C and three image forming parts 81A, 81B and 81C are respectively disposed in predetermined positions to constitute an optics unit 70A. Note that, hereinafter, the three irradiating parts 80A, 80B and 80C and the three image forming parts 81A, 81B and 81C will be respectively referred to as irradiating parts 80 and image forming parts 81, if there is no need to distinguish between them.

Figure 7:
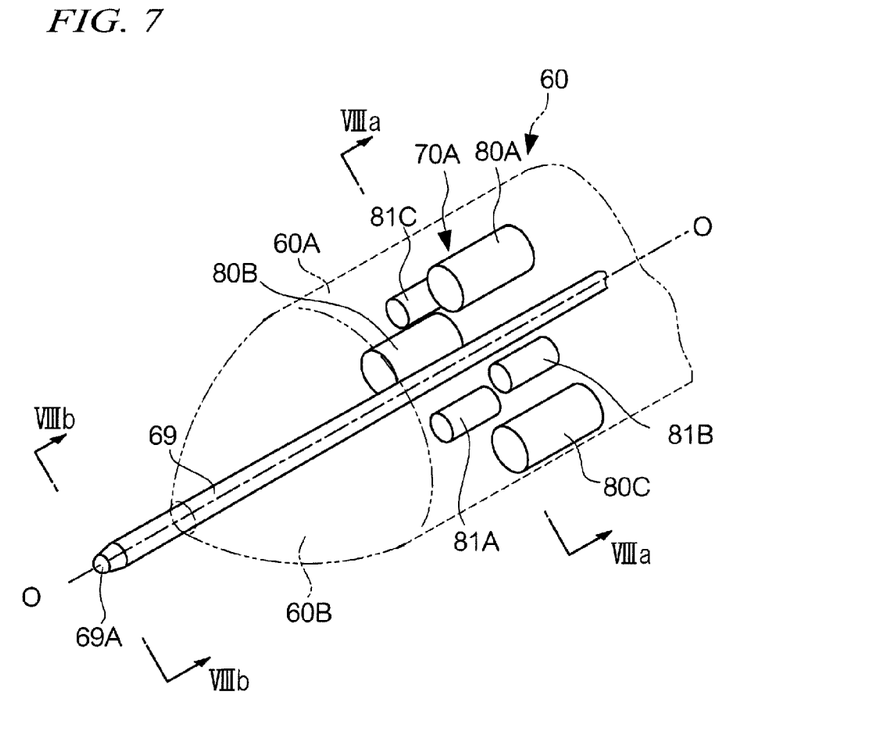
FIG. 7 is a perspective view showing characteristic parts of a digital pen.
Figure 8A:
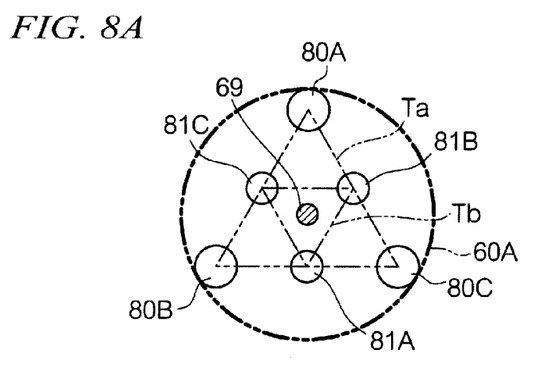
FIGS. 8A and 8B show diagrams as seen from an arrow VIIIa-VIIIa direction and an arrow VIIIb-VIIIb direction in FIG. 7.
Figure 8B:
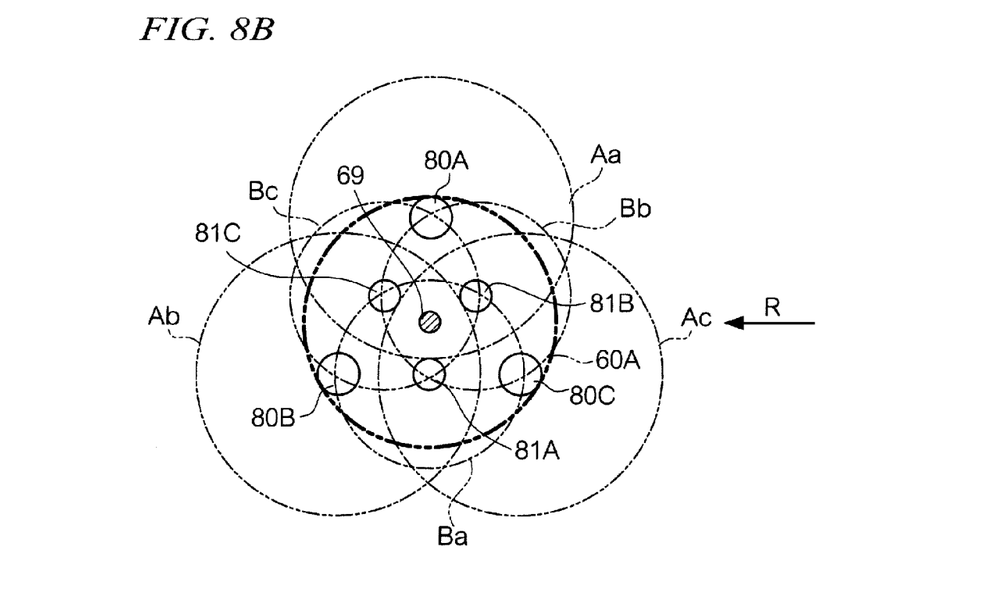

FIG. 7 is a perspective view schematically showing a front end portion of the digital pen 60, FIG. 8A is a cross-sectional view as seen from an arrow VIIIa-VIIIa direction in FIG. 7, and FIG. 8B shows the ranges of the irradiating parts 80 and the image forming parts 81 as seen from an arrow VIIIb-VIIIb direction in FIG. 7.

The pen tip 69 extending along the axis line O-O is provided in a pen body 60A that forms a casing of the digital pen 60. The pen tip 69 is for performing writing on a paper surface (medium 50). In a vicinity of the pen tip 69 forming a front end portion of the pen body 60A, a detecting unit 60B formed using a material that blocks visible light and transmits infrared light is provided, and backward of that is provided the optics unit 70A. Note that in FIG. 7, the case is illustrated where the periphery of the pen body 60A is circler, but the periphery may be a polygonal shape such as a triangle. The direction in which the user holds the digital pen 60 can be regulated, by making the digital pen 60 into a shape that is easy for the user to hold.

The irradiating parts 80A, 80B and 80C and the image forming parts 81A, 81B and 81C of the optics unit 70A are, as shown in FIG. 7, disposed around the pen tip 69 which extends in the axis line O-O direction. The irradiating parts 80A, 80B and 80C are, as shown in FIG. 8A, disposed at the vertices of an equilateral triangle Ta whose centroid is the intersection with the axis line O-O on a plane orthogonal to the axis line. In the example in FIG. 8A, the irradiating parts 80A, 80B and 80C are shown as being disposed on the upper side, the lower left side, and the lower right side, respectively. The three irradiating parts 80A to 80C are thereby disposed equidistant from the pen tip 69.

The image forming parts 81A, 81B and 81C are, similarly to the irradiating parts 80, disposed around the pen tip 69 which extends in the axis line O-O direction, along the axis line O-O direction. The image forming parts 81A, 81B and 81C are, as shown in FIG. 8A, disposed at the vertices of an equilateral triangle Tb whose centroid is the intersection with the axis line O-O of the pen tip 69 on a plane orthogonal to the axis line. In the example in FIG. 8A, the image forming parts 81A, 81B and 81C are shown as being disposed on the lower side, the upper right side, and the upper left side, respectively. The three image forming parts 81A to 81C are thereby disposed equidistant from the pen tip 69.

Since the image forming parts 81 are disposed in positions closer to the pen tip 69 than the irradiating parts 80, the equilateral triangle Tb is smaller than the equilateral triangle Ta.

Here, an irradiation range Aa of the irradiating unit 80A on the medium 50 will be described with reference to FIGS. 8A and 8B, FIG. 9 and FIG. 10. Here, the case where the digital pen 60 is placed against the surface of the medium 50 such that the axis line O-O of the pen tip 69 is orthogonal to the surface of the medium 50 will be illustrated. Note that FIG. 9 schematizes the spreading out of light irradiated from the irradiating parts 80 and the irradiation ranges thereof, in a state where the digital pen 60 is seen from the right side (arrow R direction of FIG. 8B). FIG. 10 shows the irradiation ranges at this time as seen from the medium 50 side.

The light irradiated from the irradiating parts 80A, 80B and 80C diffuses according to the directional characteristics of the irradiating parts 80A, 80B and 80C, and illuminates the irradiation ranges Aa, Ab and Ac on the medium 50. At this time, as shown in FIG. 10, the irradiation ranges Aa to Ac of the three irradiating parts 80A to 80C intersect one another in an area S that includes the position of the pen point 69A. The positions of the irradiating parts 80A, 80B and 80C, particularly the distances from the irradiating parts 80A, 80B and 80C to the pen point 69A and the pen tip 69 are designed in advance such that the irradiation ranges Aa to Ac of the irradiating parts 80A to 80C thus intersect in an area S of appropriate size. Further, since the irradiating parts 80A, 80B and 80C are disposed centered on the pen tip 69, an area that would be in the shadow of the pen tip 69 with respect to light from one of the irradiating parts (e.g., 80A) will be illuminated by light from the other irradiating parts 80B and 80C, so a shadow does not readily arise around the pen point 69A at this time.

Next, imaging ranges Ba, Bb and Bc of the image forming parts 81A, 81B and 81C will be described.

The image forming parts 81 are configured by a convex lens, for example, and form an image of the image in a prescribed imaging range B on the medium 50. The positions of the image forming parts 81, particularly the distances from the image forming parts 81A, 81B and 81C to the pen point 69A and the pen tip 69 are designed in advance such that the imaging ranges Ba, Bb and Bc of the image forming parts 81 intersect one another at the pen point 69A.

The image forming parts 81 send light to the imaging parts 82 (not shown) after having formed an image from the light reflected from the medium 50, and output image signals are supplied from the imaging parts 82 to the controller 61. The controller 61 combines the signals from the imaging parts 82, and generates a signal that depends on the image around the pen point 69A.

In this way, by using the three image forming parts 81 (imaging parts 82A to 82C), the imaging range thereof is expanded, in comparison with the imaging range of a single image forming unit 81 (imaging unit 82). Further, the area on the far side of the pen tip 69 as seen from the single image forming unit 81A (imaging unit 82A) can be read with the other image forming parts 81B and 81C (imaging parts 82B and 82C).

Figure 9:
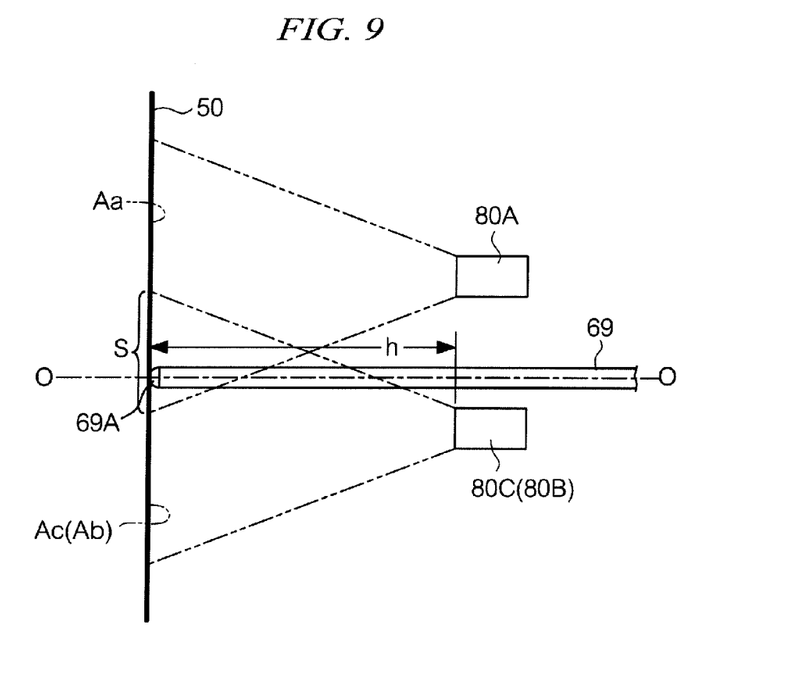
FIG. 9 shows a digital pen as seen from the right side, schematically showing irradiating parts and irradiation ranges.
Figure 10:
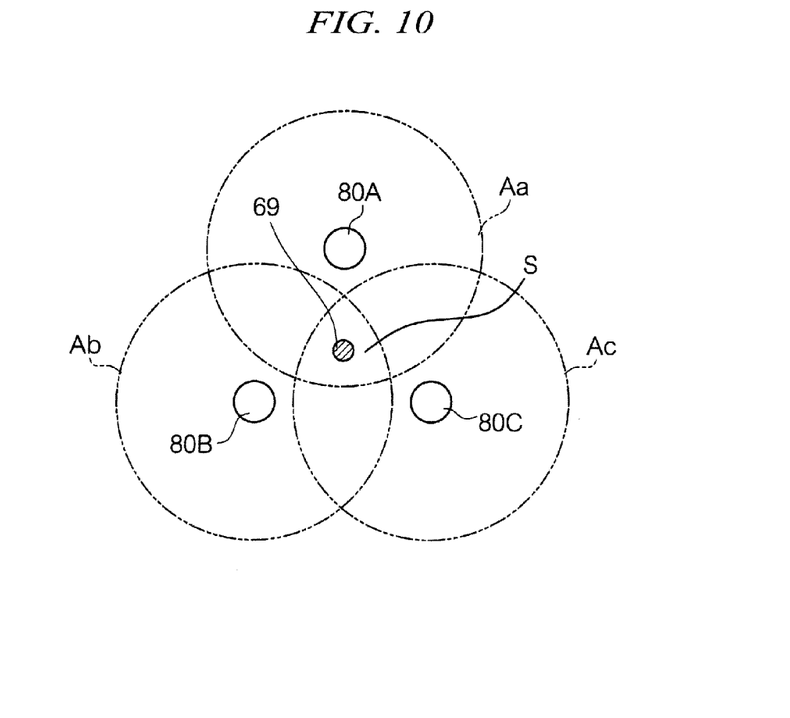
FIGS. 10 shows the irradiation ranges in FIG. 9 as seen from the medium side.

In FIGS. 8 to 10, the case where the digital pen 60 is placed against the medium 50 such that the axis line O-O of the pen tip 69 is orthogonal to the medium 50 is shown, but in actual fact, the digital pen 60 is normally used in a state of being tilted with respect to the medium 50. In order to make the user use the digital pen 60 tilted in a set direction, a mark may be added to the pen body 60A, or the portion that is held may be formed into a polygonal shape.

Figure 11:
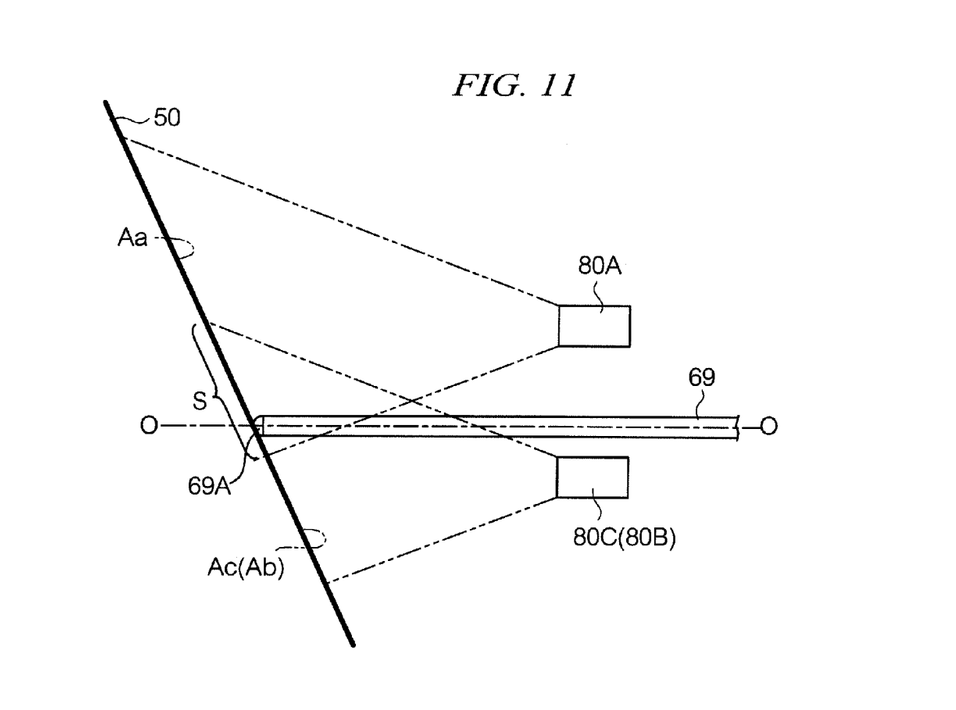
FIG. 11 shows a digital pen of the first example as seen from the right side, schematically showing irradiating parts and irradiation ranges.
Figure 12:
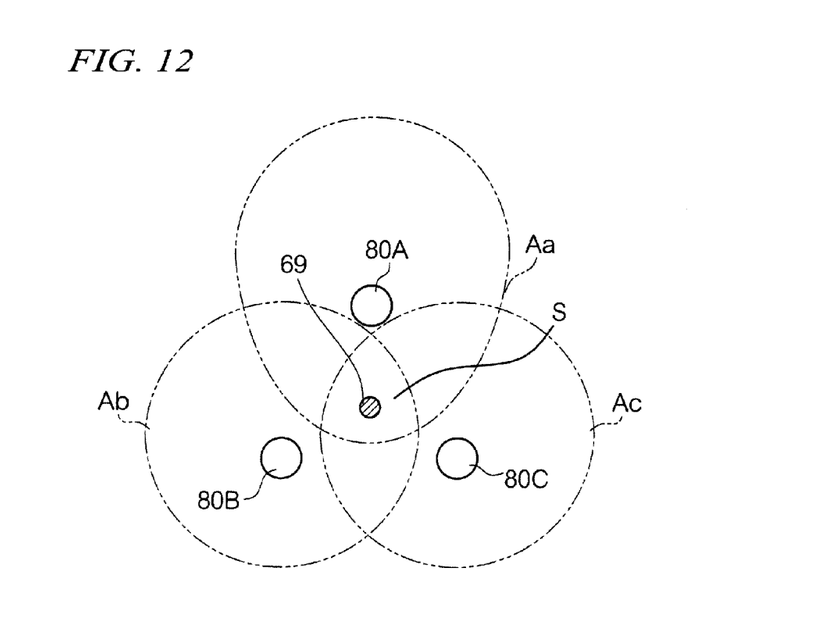
FIG. 12 shows irradiation ranges as seen from the medium side.

FIG. 11 schematizes the spreading out of light irradiated from the irradiating parts 80 and the irradiation ranges thereof, in a state where the digital pen 60 is seen from the right side (arrow R direction in FIG. 8B). FIG. 12 shows the irradiation ranges at this time as seen from the medium 50 side. Note that the irradiation ranges shown in FIG. 12 are expressed elliptically, but strictly speaking, the irradiation ranges are circular with the arc on the upper side of the irradiation ranges becoming larger, and the arc on the lower side of the irradiation ranges becoming smaller. Even in this case, the shadow of the pen tip 69 that would occur due to the light of the single irradiating unit 80A is erased by the light from the other irradiating parts 80B and 80C, so a shadow does not readily arise around the pen point 69A.

B. Operation

Next, the operation of the digital pen 60 according to the present embodiment will be described. When the user starts writing with the digital pen 60, the pressure sensor 62 connected to the pen tip 69 detects the writing operation. The controller 61 thereby starts the process of reading identification information and position information. Firstly, the illumination controller 614 transmits illumination control signals for causing the irradiating unit 80 to pulse to the irradiating unit 80, and causes the irradiating unit 80 to pulse. Also, the imaging controller 616 supplies image capture signals that are synchronized with the illumination control signals transmitted to the irradiating unit 80 to the imaging unit 82. The imaging unit 82 images the code pattern image based on the reflected light whose image is formed by the image forming unit 81, in response to the image capture signals supplied from the imaging controller 616, and outputs output image signals representing the imaged code pattern image to the code detecting unit 612.

Next, the operations of the code detecting unit 612 and the data processing unit 613 will be described with reference to the flowchart shown in FIG. 6. The output image signals representing the image on the medium 50 are input to the code detecting unit 612 from the imaging unit 82 (step S601). The code detecting unit 612 performs a process for removing noise included in the output image signals (step S602). Here, examples of noise include noise generated by electronic circuitry and variation in CMOS sensitivity. The process performed in order to remove noise is determined according to the characteristics of the imaging system of the digital pen 60. For example, a gradation process or a sharpening process such as unsharp masking can be applied. Next, the code detecting unit 612 detects the dot pattern (position of the dot images) from the image (step S603). Also, the code detecting unit 612 converts the detected dot pattern to digital data on a two-dimensional array (step S604). For example, the code detecting unit 612 converts the detected dot pattern such that positions with a dot image are "1" and positions without a dot image are "0" on the two-dimensional array. This digital data on a two-dimensional array (code pattern image) is then transferred from the code detecting unit 612 to the data processing unit 613.

The data processing unit 613 detects the dot pattern composed of the combination of two dot images shown in FIG. 2, from the transferred code pattern image (step S605). For example, the data processing unit 613 is able to detect the dot pattern, by moving the boundary positions of a block corresponding to the dot pattern over the two-dimensional array, and detecting the boundary positions at which the number of dot images included in the block is two. When a dot pattern is thus detected, the data processing unit 613 detects an identification code and a position code, based on the type of dot pattern (step S606). Subsequently, the data processing unit 613 decodes the identification code to acquire identification information, and decodes the position code to acquire position information (step S607). In the process shown FIG. 6, the case where a dot pattern is not detected from an imaged image and the digital pen 60 is unable to acquire identification information and position information (i.e., a reading error) arises, in the case where the amount of light received by the imaging unit 82 is too little or conversely in the case where the amount of received light is too much. In the case where identification information and position information cannot thus be acquired, the data processing unit 613 acquires reading failure information showing reading failure, instead of identification information and position information.

Figure 6:
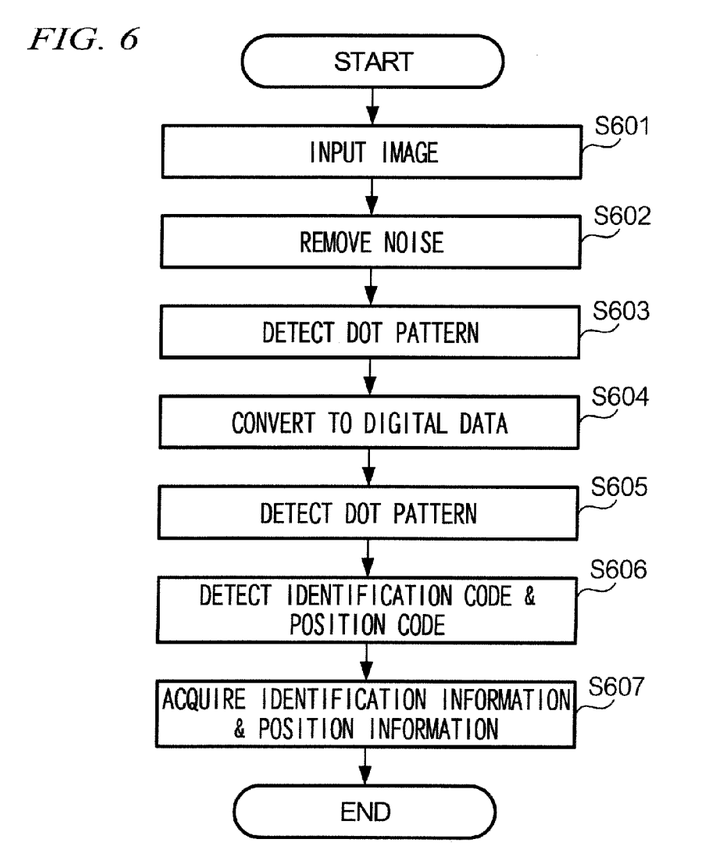
FIG. 6 is a flowchart showing operations by a code detecting unit and a data processing unit of a digital pen.

The digital pen 60 transmits the identification information and the position information acquired by the process of FIG. 6 to the information processing apparatus 10. At this time, the digital pen 60 transmits the information showing reading failure to the information processing apparatus 10, in the case where the reading of identification information and position information fails. The information processing apparatus 10 receives the identification information and the position information from the digital pen 60, and generates writing information based on the received position information. The information processing apparatus 10, in the case where information showing a reading error is received from the digital pen 60, generates writing information by interpolating or the like using identification information and position information received previously or subsequently.

As aforementioned, because the three irradiating parts 80A, 80B and 80C disposed centered on the pen tip 69 respectively illuminate around the pen point 69A, a shadow does not readily arise around the pen point 69A. Also, the area on the far side of the pen tip 69 as seen from the single image forming unit 81A can be read with the other image forming parts 81B and 81C.

Also, an irradiation range A of light irradiated onto the medium 50 by the three irradiating parts 80 is widened in comparison with a single irradiating unit 80, and the imaging range B in which image forming is performed on the medium 50 by the three image forming parts 81 is widened in comparison with a single image forming unit 81, with an image being read by combining the images obtained by the three image forming parts 81.

2. SECOND EXAMPLE

A second embodiment will now be described. Hereinafter, description of portions that are common with the first embodiment will be omitted, and only portions that differ from the first embodiment will be described.

Figure 13:
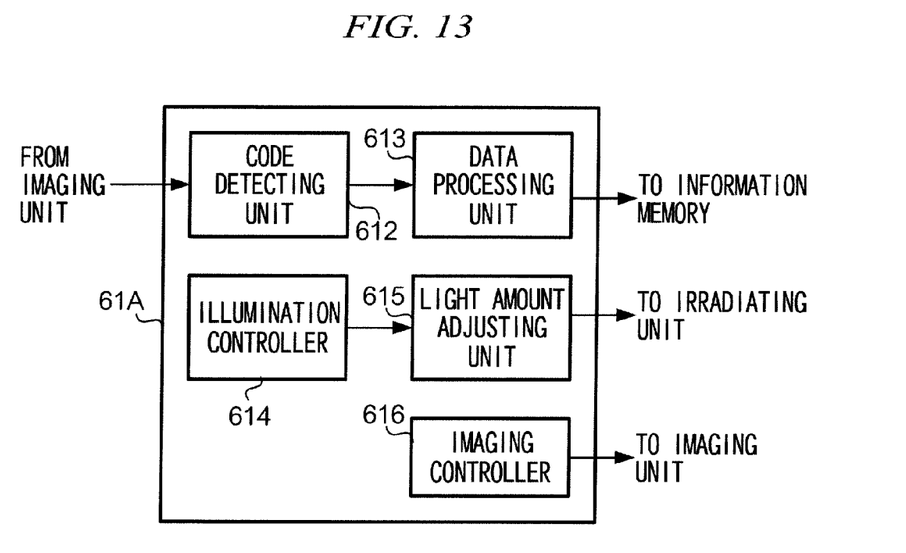
FIG. 13 is a functional block diagram showing a controller of a digital pen.

In the second embodiment, a controller 61A is used instead of the controller 61. The functional configuration of the controller 61A will be described with reference to FIG. 13. In FIG. 13, the code detecting unit 612 detects a code pattern image from the signals output from the imaging parts 82 (signals representing an imaged image). The data processing unit 613 extracts identification information and position information from the code pattern image detected by the code detecting unit 612. The illumination controller 614 transmits illumination control signals for causing the irradiating parts 80 to pulse to the irradiating parts 80 via a light amount adjusting unit 615, and causes the irradiating parts 80 (irradiating parts 80A to 80C) to pulse. The light amount adjusting unit 615 adjusts the light amount (luminance) of the irradiating parts 80 (irradiating parts 80A to 80C) according to the tilt of the digital pen 60 or the like. The imaging controller 616 supplies image capture signals synchronized with the illumination control signals transmitted to the irradiating parts 80 to the imaging parts 82.

Figure 14:
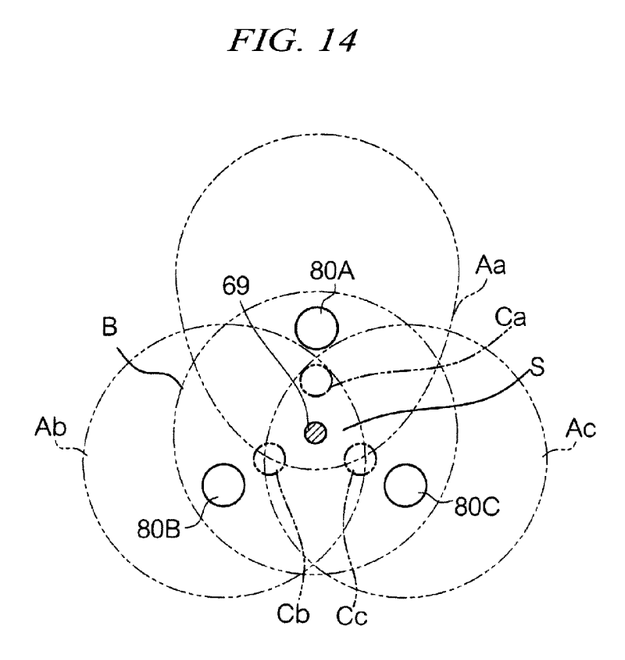
FIG. 14 shows irradiation ranges as seen from the medium side.

Here, since the irradiation range Aa of the irradiating unit 80A positioned on the upper side becomes wider, and the irradiation ranges Ab and Ac of the irradiating parts 80B and 80C positioned on the lower side become narrower in the case where the digital pen 60 is used at an angle, as shown in FIG. 11 and FIG. 14, it is evident that illuminance with respect to the medium 50 (brightness on the medium 50) will be less on the upper side of the pen point 69A than on the lower side. In the case where light of the same luminance is irradiated from the irradiating parts 80A to 80C, the illuminance on the lower side will be too much, and the illuminance on the upper side will be too little, as a result of which it may not be possible to detect the dot pattern from the image imaged in the imaging parts 82, and a reading error may arise.

In order to solve this problem, the digital pen 60 of the present embodiment is provided with a light amount adjusting unit 615 that adjusts the light amount (luminance) of the irradiating parts 80A to 80C. Also, the light amount adjusting unit 615 is incorporated in the controller 61A, together with the code detecting unit 612, the data processing unit 613, the illumination controller 614 and the imaging controller 616. This light amount adjusting unit 615 is provided with a specifying unit that specifies an irradiating unit 80 that is far from the medium 50, out of the irradiating parts 80A to 80C, and a light amount adjusting unit that adjusts the luminances of the irradiating parts 80, such that the luminance of light irradiated from the specified irradiating unit 80 is larger than the luminances of light irradiated from the other irradiating parts 80.

Figure 15:
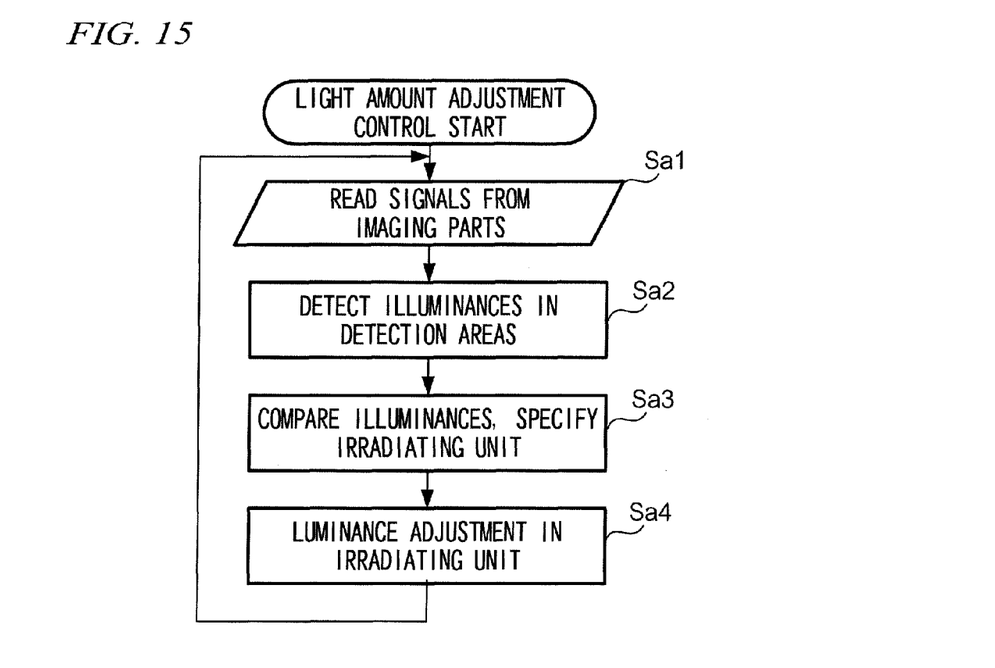
FIG. 15 is a flowchart showing operations by a light amount adjusting unit of a digital pen.

Here, the operation of the light amount adjusting unit 615 will be described with reference to the flowchart of FIG. 15.

Firstly, the light amount adjusting unit 615 reads the signals output from the imaging parts 82 (step Sa1), and detects the illuminance (intensity of reflected light) in prescribed portions (detection areas Ca, Cb, Cc) of the imaged image (imaging range B) (step Sa2). The detection areas Ca, Cb, and Cc are, as shown in FIG. 14, for example, set in positions closer to the pen point 69A than the positions at which the irradiation axes a of the irradiating parts 80A to 80C reach the medium 50. Further, the detection area Ca is for monitoring the illuminance of light irradiated from the irradiating unit 80A, the detection area Cb is for monitoring the illuminance of light irradiated from the irradiating unit 80B, and the detection area Cc is for monitoring the illuminance of light irradiated from the irradiating unit 80C.

Next, the light amount adjusting unit 615 compares the illuminances in the three detection areas Ca, Cb, and Cc. With the state in FIG. 11 and FIG. 14, the detection areas Cb and Cc have the same degree of brightness, and the detection area Ca is darker than the other detection areas Cb and Cc. Therefore, the light amount adjusting unit 615 specifies the irradiating unit 80A corresponding to the dark detection area Ca as the irradiating unit that is far from the medium 50, out of the irradiating parts 80A to 80C (step Sa3). Also, the light amount adjusting unit 615 computes the tilt direction by the size of the illuminances of the detection areas Ca, Cb and Cc, and calculates the tilt amount by digitizing the illuminances of the detection areas Ca, Cb and Cc and computing the ratios thereof.

Further, the light amount adjusting unit 615 adjusts the luminance of the specified irradiating unit 80A, in order to approximate the illuminance of light reaching the medium 50 from the irradiating unit 80A and the illuminances of light reaching the medium 50 from the irradiating parts 80B and 80C to one another (step Sa4). In the case of this example, the crest value of the illumination control signals output to the irradiating unit 80A is increased, in order to increase the luminance of the irradiating unit 80A.

Note that with this example, the luminance of the specified irradiating unit 80A is adjusted so as to be larger than the luminances of the other irradiating parts 80B and 80C, but the luminances of the other irradiating parts 80B and 80C may be made smaller than the luminance of the irradiating unit 80A. Also, by computing the tilt direction and the tilt amount, the luminances of the irradiating parts 80A to 80C may be adjusted individually, based on the computed tilt direction and tilt amount. Further, correction amounts for the irradiating parts 80A, 80B and 80C with respect to differences in the luminances of the detection areas Ca, Cb, and Cc may be mapped and prestored on ROM, and the luminance may be adjusted after determining the correction amount with reference to this map.

The light amount adjusting unit 615 performs feedback control whereby the operations of the above steps Sa1 to Sa4 are repeated. The light amount adjusting unit 615 thereby constantly monitors the illuminance of light reaching the medium 50, and realizes light amount adjustment of the irradiating parts 80A to 80C. As a result, with the digital pen 60, differences in illuminance on the medium 50 are eliminated, and reading errors are reduced.

Steps Sa1 to Sa3 in the present embodiment constitute a specific example of a specifying unit according to an aspect of the invention, and step Sa4 constitutes a specific example of a light amount adjusting unit according to an aspect of the invention.

3. OTHER EXAMPLES

The above exemplary embodiments may be modified as follows. Also, the following variations may be combined.

The second embodiment was described in terms of adjusting the luminance of the irradiating parts 80, in order to adjust the illuminance (intensity of reflected light) in prescribed portions (detection areas Ca, Cb, Cc) of an image imaged by the imaging parts 82, but the present invention is not limited to this, and control may be performed such that the illuminance in the brightest portion and the illuminance in the darkest portion are approximated to one another, by extracting the portion with the brightest luminance and the portion with the darkest luminance from the imaged image, and appropriately adjusting the light amounts of the irradiating parts 80A to 80C.

Also, the irradiating unit 80 that is far from the medium 50 may be specified by dividing the imaged image into partition detection areas, and detecting and comparing the illuminances in the partition detection areas.

The light amount adjustment of the irradiating parts 80 in the light amount adjusting unit 615 can be performed by other methods, rather than only being performed based on an image imaged by the imaging parts 82.

Figure 16:
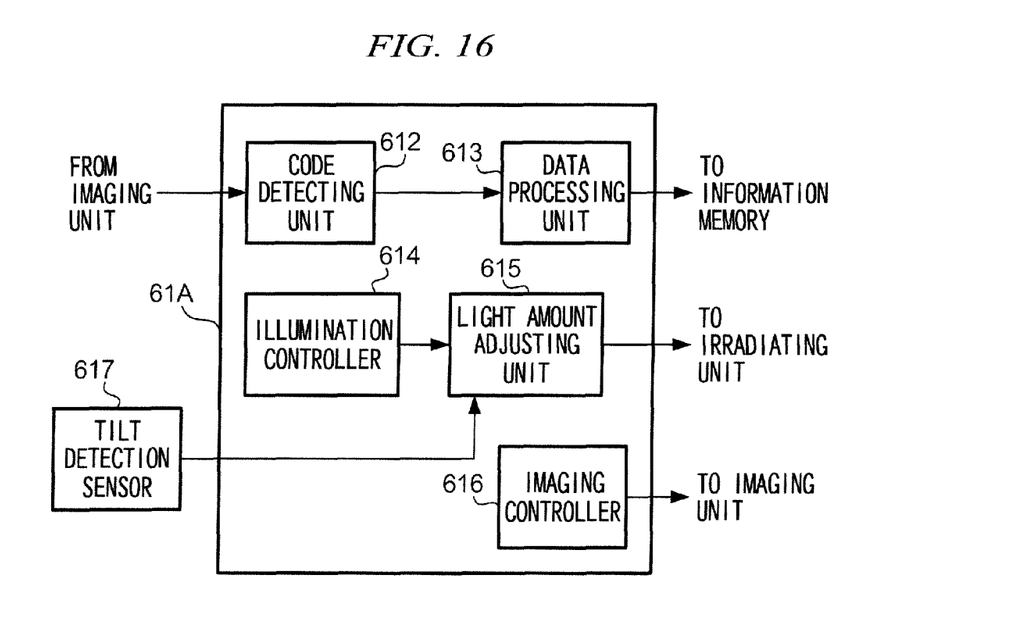
FIG. 16 is a functional block diagram illustrating a controller that includes a tilt detection sensor.

For example, as shown in the functional block diagram of FIG. 16, a tilt detection sensor 617 that detects the tilt direction and tilt amount of the digital pen 60 is provided in the pen body 60A. This tilt detection sensor 617 is a gyrosensor, a 2-axis velocity sensor that detects tilt with respect to two axes that are orthogonal to the axis line O-O, an acceleration sensor, or the like. It is preferable that detections by the 2-axis velocity and acceleration sensor is performed in the arrangement that the medium 50 is faced vertically.

Also, the light amount adjusting unit 615 specifies the irradiating unit 80 positioned on the upper side as the irradiating unit 80 that is far from the medium, by the tilt detection sensor 617 detecting the tilt direction of the digital pen 60. Further, the light amount adjusting unit 615 adjusts the luminance of the irradiating unit 80 that is far from the medium, by the tilt detection sensor 617 detecting the tilt amount of the digital pen 60. For example, the light amount adjusting unit 615 prestores correction amounts for the irradiating parts 80 corresponding to tilt amounts of the digital pen 60 on ROM, and reads out the corresponding correction amount based on the detected tilt amount and adjusts the luminance of the irradiating parts 80.

The installation positions of the irradiating parts 80 may also be adjusted, such that the distances along the axis line O-O direction from the irradiating parts 80A, 80B and 80C to the medium 50 are equal (more precisely, such that the difference in distances falls within a given value range), instead of electrically adjusting the luminances of the irradiating parts 80A to 80C in order to approximate the illuminances in the irradiation ranges Aa, Ab and Ac on the medium 50 to one another.

In the first embodiment and the second embodiment (hereinafter, the above exemplary embodiments), the irradiating parts 80 and the image forming parts 81 are fixed with respect to the pen body 60A, but the irradiating parts 80A, 80B and 80C and the image forming parts 81A, 81B and 81C may be provided rotatably around the pen tip 69, while maintaining their relative positions to one another.

Specifically, the irradiating parts 80A, 80B and 80C and the image forming parts 81A, 81B and 81C are fixed to a ring member that serves as a circular conductive member, and this ring member is rotatably supported by a supporting member around the rotation center of the pen tip 69. The ring member and the controller 61 are electrically connected with a so-called slip ring. Further, a weight is provided on the ring member. The weight is added, such that the irradiating parts 80A, 80B and 80C and the image forming parts 81A, 81B and 81C are in a fixed configuration, in a state where the digital pen 60 is tilted.

The ring member rotates under the influence of the weight, such that the irradiating parts 80A, 80B and 80C take a prescribed configuration (the most mechanically stable configuration) with respect to the medium 50, whichever direction the user tilts the digital pen 60. This means that the user no longer needs to tilt the digital pen 60 in a set direction. Note that the part connecting the ring member and the controller 61 is not limited to a slip ring, and may electrically connect the ring member and the controller 61 by a lead wire, and, in short, need only have a structure that is unlikely to cause mechanical resistance when the ring member rotates. It is preferable that the medium 50 is arranged horizontally during the digital pen 60 reads an image on the medium 50. In the case where a light amount adjusting unit is employed with respect to a digital pen having this configuration, the tilt detection sensor may be a sensor that detects the tilt amount of only one axis.

Figure 17:
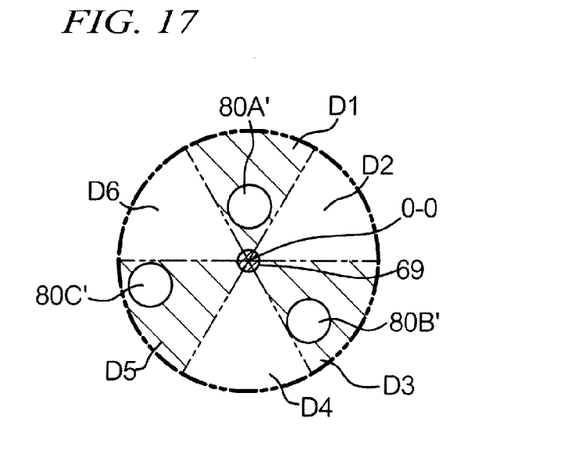
FIG. 17 shows an arrangement of irradiating parts.

In the above exemplary embodiments, the irradiating parts 80A, 80B and 80C are disposed at the vertices of the equilateral triangle Ta, but the irradiating parts 80A, 80B and 80C need not necessarily be disposed at the vertices of an equilateral triangle, and need only be disposed around the pen tip 69 with a suitable space opened up between one another, such that a shadow does not readily arise around the pen point 69A. Specifically, as shown in FIG. 17, irradiating parts 80A', 80B' and 80C' need only be disposed in every other equally divided area (e.g., D1, D3, D5), where a circle centered on the axis line O-O is equally divided by six into six wedge-shaped equally divided areas D1 to D6. At this time, the configuration position of the irradiating parts 80A', 80B' and 80C' in the equally divided areas is determined according to illuminance or the like.

Also, the number of irradiating parts 80 is not limited to three, and four or more. For example, when there are four, the four irradiating parts 80 are respectively disposed in every other equally divided area, where a circle centered on the axis line O-O is equally divided by eight into eight wedge-shaped areas. That is, in the case of N irradiating parts, the N irradiating parts need only be respectively disposed in every other non-adjacent equally divided area, where a circle centered on the axis line O-O is equally divided by 2N into 2N wedge-shaped equally divided areas. Also, the circular area composing the equally divided areas is not limited to being formed on a surface that is orthogonal to the axis line O-O, and may be formed on an angled surface centered on the axis line O-O.

Further, the number of the image forming parts 81 is not limited to three, and may be one, two, or four or more. In short, it need only be possible to form an image of the reflected light of light irradiated around the pen point 69A.

In the above exemplary embodiments, a digital pen for writing characters, graphics and the like on a medium 50 was described, but the digital pen may, for example, be provided with a pointing device (mouse) function, or a stylus function of reading information (e.g., command information) recorded in correspondence with areas on a medium.

Note that in the above exemplary embodiments, the operation in the case of writing characters and the like on a medium 50 was described, but the present invention is not limited to this, and the digital pen 60 can also be used, for example, in the case where a position on a display surface is merely designated, such as where a soft button provided on a medium 50 that functions as a display apparatus is selected.

In the above exemplary embodiments, near-infrared LEDs that irradiate near-infrared light are used as the irradiating parts 80, but the irradiating parts 80 are not limited to this, and LEDs having other light emitting properties may be used. In short, the irradiating parts 80 need only irradiate light that enables the code pattern image formed on the medium 50 to be read with the reflected light thereof.

In the above exemplary embodiments, information that uniquely identifies the medium is used as identification information, but the identification information is not limited to this, and information that uniquely identifies the electronic document may be used as identification information, for example. In the case where information that uniquely identifies the medium is used, different identification information is assigned to different media when multiple copies of the same electronic document are formed. In contrast, in the case where information that uniquely identifies the electronic document is used as identification information, the same identification information is assigned even to different media when the same electronic document is formed.

Also, in the above exemplary embodiments, a code pattern image representing position information and identification information is read, but the information represented by the code pattern image is not limited to position information or identification information, and may, for example, be information representing text data or a command, or an image representing only position information. In short, an image representing information of some sort need only be formed on the medium 50.

With the above image forming apparatus, the code pattern image is formed using K toner. This is because K toner absorbs more infrared light than C, M or Y toner, and the code pattern image is read in high contrast with the digital pen 60. However, the code pattern image can also be formed using a specialty toner. As a specialty toner, an invisible toner with a maximum absorption rate in a visible light region (400 nm to 700 nm inclusive) of 7% or less, and an absorption rate in a near-infrared region (800 nm to 1000 nm inclusive) of 30% or more can, for example, be used. Note that "visible" and "invisible" are distinguished not by whether the toner is visually perceivable, but by whether an image formed on a medium can be perceived due to whether the toner has color developing properties attributed to the absorption of specific wavelengths in the visible light region. Also, a toner that has some color developing properties attributed to the absorption of specific wavelengths in the visible light region but is difficult to perceive with the human eye is also included as "invisible". Also, this invisible toner desirably has an average dispersion diameter in a range of 100 nm to 600 nm inclusive, in order to enhance the near-infrared light absorption capability necessary for mechanical reading of images.

Also, the image forming apparatus is not limited to an electrophotographic system, and may use any other system, such as an inkjet system.

A computer program that is executed by the controller 61 of the digital pen 60 can be provided in a state of being stored on a computer-readable recording medium such as a magnetic recording medium (magnetic tape, magnetic disk, etc.), an optical recording medium (optical disk, etc.), a magneto-optical recording medium, or a semiconductor memory. Also, the computer program can be downloaded to the digital pen 60 via a network such as the Internet. Note that various devices other than a CPU can be applied as a controller that performs the abovementioned control, and a dedicated processor may be used, for example.

The foregoing description of the embodiments of the present invention is provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus comprising:
a pointer having an axis extending along an axis line, that indicates a position on a medium;
N (N>3) irradiating units that respectively irradiate light toward an area that includes the position;
image forming units which are respectively disposed one in each of non-adjacent equally divided areas selected from 2N equally divided areas, where a circle centered on the axis line is divided by 2N into equal segments; and
a signal generator that generates, from the irradiated light reflected by the medium, a signal representing an image on the medium,
wherein areas in which light is irradiated by the N irradiating units overlap to form a predetermined overlapping area.

2. The image reading apparatus according to claim 1, wherein the N irradiating units are respectively disposed one in each of non-adjacent equally divided areas selected from 2N equally divided areas, where a circle centered on the axis line is divided by 2N into equal segments.

3. The image reading apparatus according to claim 2, wherein N=3, and each of the irradiating units is disposed at a vertex of an equilateral triangle whose centroid is the axis line.

4. The image reading apparatus according to claim 1, wherein when a direction and an extent of tilt of the axis line with respect to the medium is predetermined, an irradiating unit positioned farther from the medium is controlled to increase an intensity of light irradiated toward the medium by the irradiating unit positioned farther from the medium, in comparison with an intensity of light irradiated toward the medium by an irradiating unit positioned closer to the medium.

5. The image reading apparatus according to claim 2, wherein when a direction and an extent of tilt of the axis line with respect to the medium is predetermined, an irradiating unit positioned farther from the medium is controlled to increase an intensity of light irradiated toward the medium by the irradiating unit positioned farther from the medium, in comparison with an intensity of light irradiated toward the medium by an irradiating unit positioned closer to the medium.

6. The image reading apparatus according to claim 1, further comprising:
a specifying unit that specifies one of the irradiating units positioned farther from the medium; and
an adjustor that adjusts an amount of light irradiated toward the medium from each of the irradiating units, to cause an illuminance of light reaching the medium from the specified one of the irradiating units to be larger than an illuminance of light reaching the medium from an irradiating unit other than the specified one of the irradiating units.

7. The image reading apparatus according to claim 6, wherein the specifying unit identifies an intensity of reflected light corresponding to each of the irradiating units, so as to specify an irradiating unit corresponding to reflected light having a smaller intensity as an irradiating unit positioned farther from the medium.

8. The image reading apparatus according to claim 6, further comprising a first detector that detects a direction of tilt of the axis line with respect to the medium,
wherein the specifying unit specifies an irradiating unit positioned farther from the medium, based on the direction of tilt detected by the detector.

9. The image reading apparatus according to claim 7, further comprising a second detector that detects an extent of tilt of the axis line with respect to the medium,
wherein the adjustor calculates an amount of light irradiated toward the medium from the specified one of the irradiating units, based on the extent of tilt detected by second detector, to cause the amount of light irradiated toward the medium from the specified one of the irradiating units to be equal to the calculated amount of light.

10. The image reading apparatus according to claim 6, wherein the N irradiating units are respectively disposed one in each of non-adjacent equally divided areas, out of 2N equally divided areas, where a circle centered on the axis line is divided by 2N into equal segments.

11. An image reading method comprising: pointing to a position on a medium with an end of an axis extending along an axis line;
irradiating light toward a medium area that includes the pointed to position on the medium by N (N>3) irradiating parts;
collected, by image forming units, the irradiated light reflected by the medium at each of non-adjacent equally divided areas selected from 2N equally divided areas, where a circle centered on the axis line is divided by 2N into equal segments; and
generating, from the irradiated light reflected by the medium, a signal representing an image on the medium,
wherein areas in which light is irradiated by the N irradiating units overlap to form a predetermined overlapping area.

12. The image reading method according to claim 11, wherein the N irradiating units are respectively disposed one in each of non-adjacent equally divided areas, out of 2N equally divided areas, where a circle centered on the axis line is divided by 2N into equal segments.

13. The image reading method according to claim 12, wherein N=3, and each irradiating unit is disposed at a vertex of an equilateral triangle whose centroid is the axis line.

14. The image reading method according to claim 11, wherein when a direction and an extent of tilt of the axis line with respect to the medium is predetermined, an irradiating unit positioned farther from the medium is controlled to increase an intensity of light irradiated toward the medium by the irradiating unit positioned farther from the medium, in comparison with an intensity of light irradiated toward the medium by an irradiating unit positioned closer to the medium.

15. The image reading method according to claim 12, wherein when a direction and an extent of tilt of the axis line with respect to the medium is predetermined, an irradiating unit positioned farther from the medium is controlled to increase an intensity of light irradiated toward the medium by the irradiating unit positioned farther from the medium, in comparison with an intensity of light irradiated toward the medium by an irradiating unit positioned closer to the medium.

16. The image reading method according to claim 11, further comprising:

specifying one of the irradiating units positioned farther from the medium; and adjusting an amount of light irradiated toward the medium from each of the irradiating units, to cause an illuminance of light reaching the medium from the specified one of the irradiating units to be larger than an illuminance of light reaching the medium from an irradiating unit other than the specified one of the irradiating units.

17. The reading method according to claim 16, wherein in the specifying step, an intensity of the reflected light for each of the irradiating units is identified, so as to specify an irradiating unit corresponding to reflected light having a smaller intensity as an irradiating unit positioned farther from the medium.

18. The reading method according to claim 16, further comprising detecting a direction of tilt of the axis line with respect to the medium, wherein in the specifying step, an irradiating unit positioned farther from the medium is specified based on the detected direction of tilt.

19. The reading method according to claim 17, further comprising detecting an extent of tilt of the axis line with respect to the medium, wherein the adjusting step comprises calculating an amount of light irradiated toward the medium from the specified one of the irradiating units, based on the detected extent of tilt, to cause the amount of light irradiated toward the medium from the specified one of the irradiating units to be equal to the calculated amount of light.

20. The image reading apparatus according to claim 1, wherein an equilateral triangle Tb formed by the irradiating units is smaller than an equilateral triangle Ta formed by the image forming units.

* * * * *